United States Patent [19]

Jensen et al.

[11] Patent Number: 5,801,500
[45] Date of Patent: Sep. 1, 1998

[54] MOTOR/COMPRESSOR COMBINATION HAVING A CONTROL ARRANGEMENT FOR STARTING THE MOTOR WITH ASYNCHRONOUS AND THEN SYNCHRONOUS COMMUTATION

[75] Inventors: Finn Jensen; Jan Carøe Aarestrup, both of Nordborg; Finn Visgaard Nielsen, Sønderborg, all of Denmark

[73] Assignee: Danfoss A/S, Nordborg, Denmark

[21] Appl. No.: 616,966

[22] Filed: Mar. 18, 1996

[30] Foreign Application Priority Data

Mar. 18, 1995 [DE] Germany .................. 195 09 914.1

[51] Int. Cl.$^6$ ............................................. H02P 6/20
[52] U.S. Cl. ........................ 318/254; 318/431; 417/44.1
[58] Field of Search .............................. 318/138, 254, 318/439, 700, 701, 705, 720–724, 430, 431; 418/40; 236/67, 74 R, 75, 76; 417/44.1, 45, 44.11, 410.1, 415, 460, 461

[56] References Cited

U.S. PATENT DOCUMENTS

| | | | |
|---|---|---|---|
| 4,758,768 | 7/1988 | Hendricks et al. | 318/254 |
| 5,253,481 | 10/1993 | Takagi et al. | 62/126 |
| 5,446,354 | 8/1995 | Hiruma | 318/439 |
| 5,518,373 | 5/1996 | Takagi et al. | 417/45 |

FOREIGN PATENT DOCUMENTS

| | | |
|---|---|---|
| 0621681 | 10/1994 | European Pat. Off. |
| 5-98097 | 11/1994 | Japan |

*Primary Examiner*—Bentsu Ro
*Attorney, Agent, or Firm*—Lee, Mann, Smith, McWilliams, Sweeney & Ohlson

[57] ABSTRACT

A method for operating a motor/compressor combination, especially for hermetically-encapsulated small refrigerating machines, comprises a compressor having a periodically operating displacement element, which is driven by a brushless motor (3). To start the motor, it is subjected to asynchronous and then synchronous commutation of its stator windings (7,8,9). For starting, the rotor is turned by asynchronous commutation from any given rest position to a starting position that facilitates running-up and is then started from that starting position. A motor/compressor combination for carrying out that method has a control arrangement (10) which, in asynchronous commutation, enables the current-application patterns to succeed one another in such a manner that the rotor is turned from the rest position to the starting position and is started therefrom. In that manner, the motor/compressor combination can be started reliably even in the event of unfavourable conditions.

15 Claims, 2 Drawing Sheets

| STEP | 1 | 2 | 3 | 4 | 5 | 6 | 7 | 8 | 9 | 10 | 11 |
|---|---|---|---|---|---|---|---|---|---|---|---|
| POSITION AXIS | U | W | - | U | -W | V | -U | W | -V | U | |
| DURATION (ms) | 88 | 3 | 280 | 88 | 88 | 88 | 280 | 280 | 280 | 88 | |
| PISTON POSITION (O) | 0/180 | UN-KNOWN | NEAR 0 | 0 | 330 | 300 | 270 | 240 | 210 | 180 | START |

Fig. 2
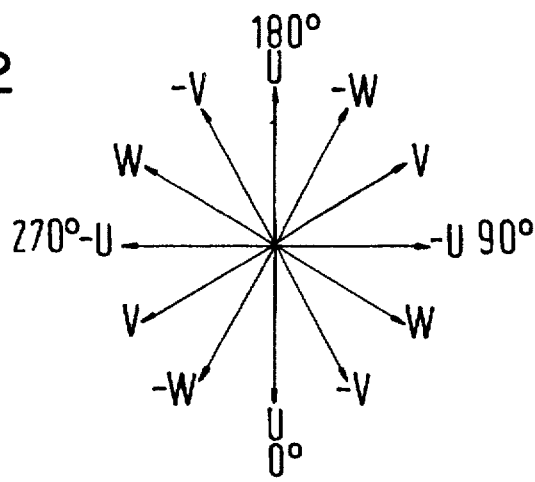
Fig. 3a1 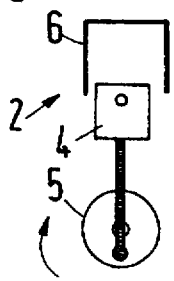 Fig. 3a2  Fig. 3a3  Fig. 3a4 
Fig. 3b1 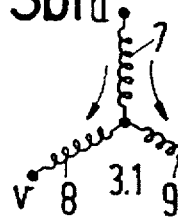 Fig. 3b2  Fig. 3b3  Fig. 3b4 

MOTOR/COMPRESSOR COMBINATION HAVING A CONTROL ARRANGEMENT FOR STARTING THE MOTOR WITH ASYNCHRONOUS AND THEN SYNCHRONOUS COMMUTATION

BACKGROUND OF THE INVENTION

The invention relates to a method for operating a motor/compressor combination, especially for hermetically-encapsulated small refrigerating machines, in which method, for starting, a brushless motor is subjected to asynchronous and then synchronous commutation of its stator windings, and also to a motor/compressor combination having a brushless motor which has a stator having at least two windings and a rotor having permanent magnet poles, and also a control arrangement which applies current to the windings in successive patterns and, for starting, effects asynchronous and then synchronous commutation of those current-application patterns, for carrying out that method.

From EP 0 621 681 A1 a motor/compressor combination of that type is known in which the control equipment has a pulse-width modulated inverter (PWM), by means of which a brushless permanent magnet motor (BPM) can be operated at variable speed. A four-pole motor having a three-phase stator winding is given by way of example. To enable synchronous commutation, position signals are obtained from the back e.m.f. which the permanent magnet poles of the rotor induce in the stator windings. Thus, no additional position sensors, such as Hall elements, inductive measuring sensors, coding devices or the like, are required. The motor must, however, have a specific minimum speed, for example 400 rev/min, so that the back e.m.f., which is directly proportional to the speed, can be measured.

For that reason, for starting, asynchronous commutation of the windings must be effected, that is to say enforced commutation with a specific sequence of the current-application patterns that distribute current to the stator windings, which commutation is effected independently of the position of the rotor. This, however, does not ensure that the compressor actually runs up.

That is especially true when the compressor has to be started against a load, which is the case, for example, if the compressor is to be restarted shortly after stopping because there is then still a difference in pressure in the system between the pressure side and the suction side which has to be overcome by the compressor on starting. For reliable starting, it was necessary either to wait until the pressure had equalized itself after a relatively long period of time or to make an enforced reduction in the difference in pressure by using an additional valve.

The problem underlying the invention is to increase the reliability with which a motor/compressor combination of the type described at the outset will run up reliably even under unfavourable loading conditions.

SUMMARY OF THE INVENTION

That problem is solved according to the invention in that a compressor having a periodically operating displacement element is used and the rotor is turned by asynchronous commutation from any given rest position to a starting position that facilitates running-up and is then started from that starting position.

The use, known per se, of a compressor having a periodically operating displacement element, whether it be an axial piston compressor or a rotary piston compressor, offers the possibility of selecting a starting position, which, by taking into consideration the relatively low-load suction stroke, facilitates running-up. With the aid of asynchronous commutation, the rotor can be brought into that starting position before actual starting because, in every case, the rotor can be further turned by a predetermined angle by switching the current-application patterns.

It is most advantageous if, in the case of an axial piston compressor, the starting position corresponds approximately to the top dead-centre of the piston. This results in an angle of rotation of more than 180° before the motor is loaded. This gives the rotor such high speed that position signals, especially from the back e.m.f., are obtained very rapidly and synchronous commutation can commence. The torque then produced by the motor including the moment of inertia of the rotating parts is sufficient to enable the motor to run up even against a difference in pressure still present between the pressure side and the suction side.

For the same reasons, it is recommended that, in the case of a single-cylinder rotation-type compressor having a separator slider guided in the cylinder, the starting position corresponds approximately to the position in which the separator slider is pushed fully outwards by the displacement element.

It is especially advantageous that, when the rotor turns and effects compression, the commutation time intervals in asynchronous commutation are so great that a substantial portion of the compressed gas leaks past the displacement element. In that manner, the displacement element is turned very slowly, but without excessive loading, towards the starting position.

In the case where a current-application pattern is associated with more than one rotated angular position, it is recommended that the rotor first be turned by asynchronous commutation from its respective rest position to an intermediate position corresponding approximately to bottom dead-centre and only then turned to the starting position. The intermediate position corresponding to bottom dead-centre is a preferred assumed position solely by virtue of the pressure ratios. The given sequence of current-application patterns is then sufficient to move the rotor to the starting position.

To reach the intermediate position between two commutation times, it is advantageous to turn off the current through the stator arrangements. Whilst the current is turned off, the movable parts of the compressor which are then loaded only by the pressure can oscillate in the region of bottom dead-centre until virtual standstill arises.

A suitable motor/compressor combination for carrying out that method is characterized according to the invention in that the compressor has a periodically operating displacement element and the current-application patterns in asynchronous commutation succeed one another in such a manner that the rotor is turned from any given rest position to a starting position that facilitates running-up and is then started from that starting position. The angle of acceleration, that is to say the angular distance between the starting position of the rotor and the position in which the maximum compressive torque occurs is extremely large and is approximately 320°.

In the case that on turning the rotor relatively high compression is effected, it is recommended that the control arrangement render the current-application patterns effective over a longer period of time than in the case of turning that effects lesser compression.

It is especially advantageous that the motor has four poles and the stator three windings in star connection and that the control arrangement is able to produce six current-application patterns in each of which one winding has current applied and the other two windings have one half of that current applied, and, in the case of asynchronous commutation, renders those current-application patterns effective at a given sequence. In that arrangement, there are twelve stable rotor positions that are displaced by 30° with respect to one another. Since all three windings are supplied with current, a strong torque occurs. The rotor therefore moves reliably from one rotated angular position to the next.

A preferred arrangement ensures that in the given sequence there succeed one another a first current-application pattern, which drives the rotor into one of the dead-centre positions (0° or 180°), a second current-application pattern, which displaces the rotor from the dead-centre position assumed (0° or 180°), a switching off of current, in which the rotor moves under the effect of the compressed gas into the vicinity of the bottom dead-centre position (0°), and optionally a third current-application pattern, which drives the rotor exactly into the bottom dead-centre position (0°). That measure takes into account the fact that two rotated angular positions are associated with each of the six current-application patterns. Well-defined ratios result, however, by making use of the bottom dead-centre position.

It is further advantageous that, in the given sequence, current-application patterns succeed one another that each correspond to rotor positions that are displaced by 30° with respect to one another, as a result of which the rotor is turned from the intermediate position corresponding approximately to bottom dead-centre (0°) to the starting position corresponding to top dead-centre (180°). Further turning by 30° enables the starting position to be reached reliably.

It is recommended that the effective duration of preceding current-application patterns be shorter than the effective duration of subsequent current-application patterns. That means that the current-application patterns are effective over a longer period of time in the region of higher compression so that there is sufficient time for compressed gas to leak past the displacement element.

The invention is described hereinafter in more detail with reference to a preferred embodiment shown in the drawings, in which:

BRIEF DESCRIPTION OF THE DRAWINGS

FIG. 2 shows six rotor position axes for a three-phase, four-pole motor;

FIGS. 3a1 to 3a4 show four positions of the piston of an axial piston compressor;

FIGS. 3b1 to 3b4 show the current-application patterns associated with the positions of FIG. 3a;

FIG. 4 is a loading diagram for such an axial piston compressor;

DESCRIPTION OF EXAMPLES EMBODYING
THE BEST MODE OF THE INVENTION

Figures 1, 5:
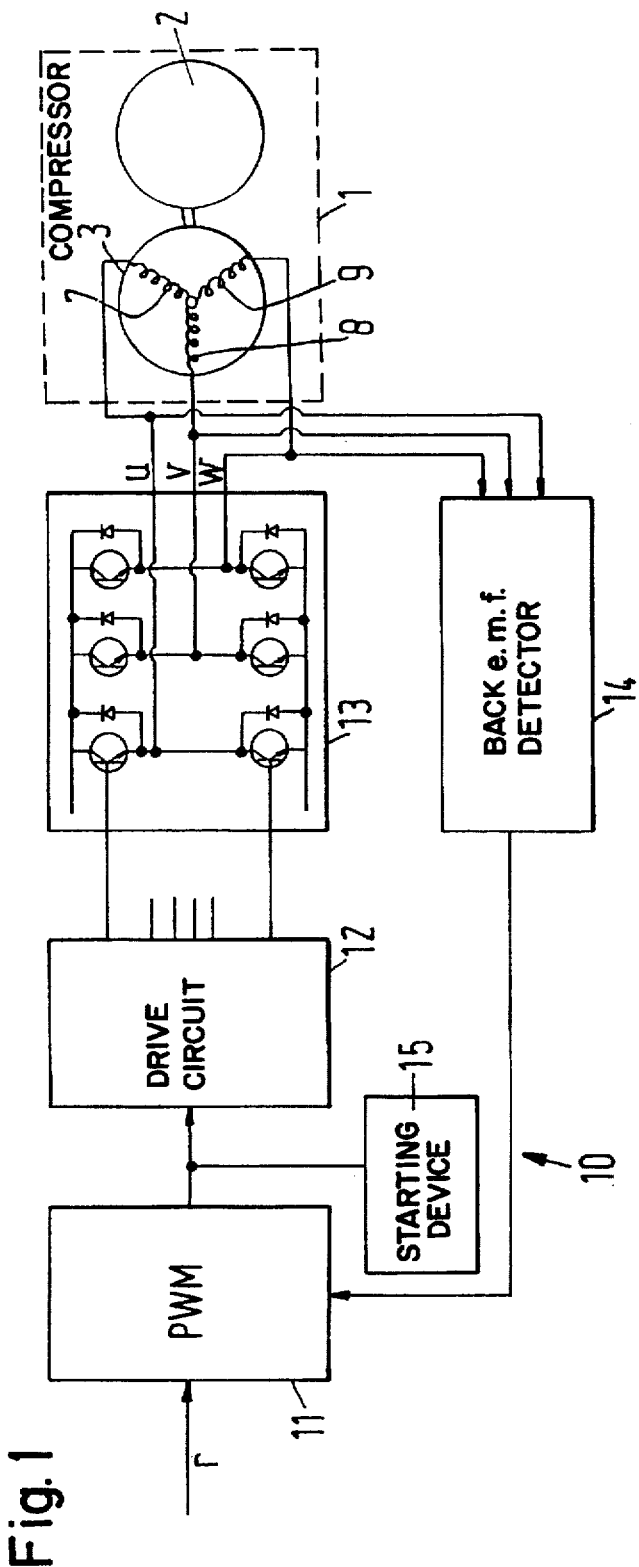
FIG. 1 is a block diagram of a hermetically-encapsulated small refrigerating machine having a control arrangement.
FIG. 5 is a table giving details about the sequence of the current-application patterns.

In FIG. 1, arranged inside a hermetically-sealed capsule 1 is a compressor 2 which is driven by an electric motor 3. As shown in FIG. 3, the compressor 2 has a displacement element 4 in the form of a piston which is moved back and forth in a cylinder 6 by a crank mechanism 5. Alternatively, a rotation-type compressor, for example in the form of a rotary or rolling piston compressor, having similar loading characteristics may be used. The motor 3 has four poles. It has a permanent magnet rotor and is provided with three windings 7, 8, 9 in star connection which are supplied with current via the connections u, v and w. Alternatively, a motor having a different number of poles and windings can be used.

According to FIG. 1, a control arrangement 10 for the motor/compressor combination has a pulse-width modulation (PWM) regulator 11 having connected after it a drive circuit 12 and a three-phase inverter 13 which supplies the connections u, v and w. The pulse-width modulation of the windings is effected by a known component, the "Field Programmable Gate Array" (FPGA). Control can alternatively be effected by using discrete digital components or by an ordinary microprocessor.

A back e.m.f. detector 14 measures the back e.m.f. in the non-current-carrying winding in question in known manner. Thus, if current flows through windings 7 and 8, the voltage across winding 9 is measured. For that purpose, the regulator 11 sets suitable current-application patterns. In that manner, position signals are obtained for the rotated angular position of the rotor, which signals influence the regulator 11 in respect of the pulse-width modulation. Furthermore, a speed reference r is supplied to the regulator so that the compressor 2 can be operated at variable speed in dependency on the refrigeration requirement.

Operation which can be achieved with the aid of the position signals obtained from the back e.m.f. is referred to as "synchronous commutation". It is, however, possible only if the motor 3 has sufficient speed to produce such a large back e.m.f. that it does not disappear in the general noise. That means that no synchronous commutation can take place during the starting process. For that reason, there is provided in the control arrangement 10 a starting device 15 which delivers a sequence of current-application patterns in asynchronous commutation, that is to say without being controlled by a position signal, as described hereinafter in more detail.

FIG. 2 shows six position axes U, V and W, each occupied twice, that is a total of twelve positions which the rotor and therefore the displacement element 4 can assume when current-application patterns are used in which a current is associated with one winding and one half of that current is associated with each of the other two windings. Thus, the position axis U applies both for bottom dead-centre (cf. 3.1 in FIG. 3b1) and for top dead-centre (cf. 3.4 in FIG. 3b4). In between those positions, there can be obtained positions that are each displaced by 30°.

The number of positions is calculated as follows: the number of poles times the number of windings, which, in the present case, gives twelve positions or six position axes. The accuracy of the positioning can be improved or impaired by altering the number of windings or poles. A two-pole three-phase motor has, for example, only six positions but the positioning is well-defined.

Figure 4:
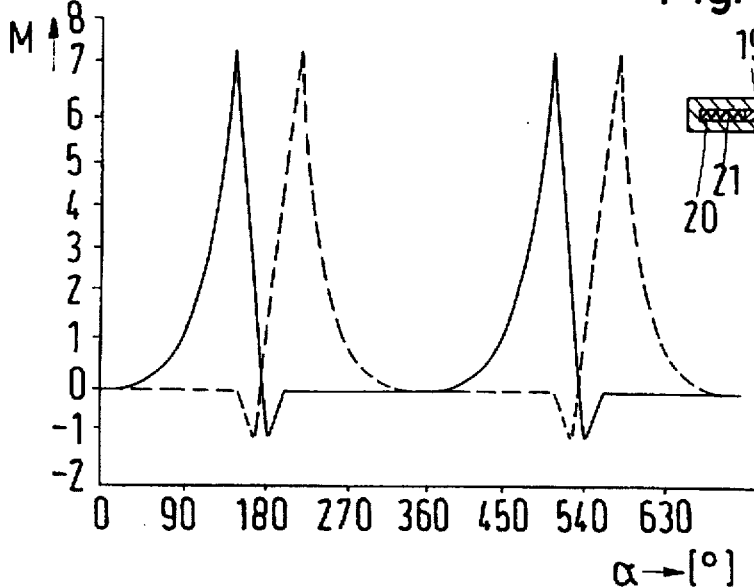

Each of the twelve positions of the rotor corresponds to a point in the working cycle, as illustrated in the loading diagram of FIG. 4. The solid line indicates the loading moment M on rotation in the positive direction, that is to say counter-clockwise. The broken line indicates the same loading diagram in the case of turning in the negative direction.

It can be seen that the moment M increases to a peak value from bottom dead-centre (0°) up to an angle of 140° and then decreases again, on account of the pressure valve, which has opened in the meantime, until top dead-centre has been reached. Turning then occurs without substantial loading until bottom dead-centre has been reached again.

For the motor to set itself to position axis U, the total current must flow through winding 7 whilst flowing away via windings 8 and 9. Accordingly, position axis -W results when the current flows away via winding 9 and flows in through windings 7 and 8 (cf. 3.2 in FIG. 3). Accordingly, position axis -V is given when the current flows away through winding 8 and flows in via windings 7 and 9 (cf. 3.3 in FIG. 3). The same applies for the other position axes. The position axis thus corresponds to that connection which is acted upon by the full current, the polarity sign indicating the direction of the current.

The starting action is now described in more detail with reference to the table according to FIG. 5. Eleven steps are given therein, which are effected one after the other each for a specific duration, the position axis corresponding to a specific current-application pattern and a rotor position, and therefore a piston position, corresponding to each position axis. It should be noted that the current-application patterns correspond in each case to a state in which one winding is acted upon by the full current whilst one half of that current flows in each of the other two windings. This is in contrast to normal operation in which, at least at times, current-application patterns are also provided in which just two windings are acted upon by current whilst the third currentless winding serves to measure the back e.m.f..

In step 1, position axis U is activated. That means that the piston 4 is displaced either to top dead-centre (180°) or to bottom dead-centre (0°). If one assumes the improbable case that the piston has stopped at top dead-centre, in step 2 it is moved under very short-term activation of position axis W in the direction of bottom dead-centre. During that movement, the remaining pressurised gas in the work chamber together with the electromagnetic torque press the piston downwards. The pressure of the gas and the inertia of the rotor are given up to the piston as kinetic energy, which piston therefore does not stop at bottom dead-centre. Instead, the turning movement of the rotor continues past bottom dead-centre until the remaining moment of movement of the rotating parts is equal to the load moment coming from the gas pressure. Meanwhile, the current is completely turned off in step 3 for a relatively long time, in this case 280 ms, so that the oscillating rotating parts come virtually to a standstill. When position axis U is reactivated in step 4, the piston assumes a desired intermediate position at bottom dead-centre. If, on the other hand, the piston 4 has already reached bottom dead-centre in step 1, it is likewise displaced in step 2, can then execute pendulum-like oscillation in step 3 and returns, in step 4, to the intermediate position.

For the subsequent steps 5 to 10, a defined starting position, that is to say the intermediate position at bottom dead-centre, is therefore given. Current-application patterns are given in succession that each displace the rotor and/or piston by 30°. Initially (steps 5 and 6), loading by the gas, slowly being compressed, is slight. Relatively short active periods of 88 ms are therefore sufficient. Subsequently, however, the loading moment would rise quite substantially. For that reason, substantially longer activation periods, that is to say of 280 ms, are provided. These allow the piston to continue to move very slowly, compressed gas leaking past the piston as a result of unavoidably imperfect sealing. As a result, the loading moment that has to be overcome for positioning is considerably smaller than under normal operating conditions. For example, the peak loading moment during operating is approximately 7.4 Nm but during steps 5 to 10, however, is only 3 Nm. After step 10, the piston has reached top dead-centre and the rotor has reached its starting position. The positioning of the piston is thus completed and starting of the motor can commence. Since the motor starts to run unloaded, its speed increases rapidly. The first commutation can be effected asynchronously still. The associated time can be calculated in advance from knowledge of the rotor's moments of inertia. Generally, however, such a high speed applies at the next commutation that the transition can be made to normal synchronous commutation wherein current-application patterns in which a winding has no current flowing through it can also be used. By virtue of the acceleration given to the rotor, no difficulties arise in overcoming the loading peak in accordance with an angle of acceleration $\beta=320°$ (cf. piston starting position 3.4 in FIG. 3b4 and the solid line in FIG. 4) even if the compressor were to have been turned off just shortly before and therefore a considerable difference in pressure between the pressure side and the suction side still had to be overcome.

The starting method described generally does not need to be carried out if the differential pressure has already been reduced. In that case, it is recommended that a pressure equilibrium detector be provided which, when the difference in pressure falls below a given value, renders the starting device 15 ineffective and drives the motor immediately with the aid of the regulator 11.

In total, therefore, a motor/compressor combination is obtained in which the compressor can start even under the most unfavourable conditions. There are no false starts since the rotor will always turn in the right direction because the motor is commutated correctly from the outset. The time from starting to reliable detection of the back e.m.f. is considerably reduced, which ensures a faster transition to the operating state. The start does not have to be delayed until pressure equilibrium has occurred in the refrigerating system. Valves for the selective reduction of the difference in pressure are unnecessary.

Figure 6:
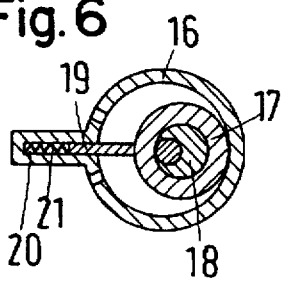
FIG. 6 shows a single-cylinder rotation-type compressor.

FIG. 6 shows a rotation-type compressor having a cylinder 16 and a displacement element 17 revolving therein which is driven by an eccentric 18. A separator slider 19 is arranged between the suction side and the pressure side. It is guided in a slot 20 on the cylinder 16 and is biassed by a spring 21. Such a compressor has a loading characteristic similar to that of FIG. 5. The preferred starting position is located near the position in which the separator slider 19 is pushed in furthest into the slot 20.

Instead of the pulse-width modulated control of the motor as shown, the inventive concept can also be applied to a motor having constant speed and simple ON-OFF type control.

The claimed motor/compressor combination is suitable, for example, for freezer units or also for air conditioning in motor vehicles.

We claim:

1. Method for operating a motor/compressor combination having a brush-less motor, comprising the steps of, for starting, subjecting the motor to asynchronous and then synchronous commutation of its stator windings, employing a compressor having a periodically operating displacement element wherein output from the compressor is intermittent, turning the rotor of the motor by asynchronous commutation from its rest position to a starting position that facilitates start-up, and then starting the motor from that starting position.

2. Method according to claim 1, in which in an axial piston compressor the starting position corresponds approximately to top dead-centre of the piston.

3. Method according to claim 1, in which in a single-cylinder rotation-type compressor having a separator slider guided in a cylinder, the starting position corresponds approximately to the position in which the separator slider is pushed fully outwards by a displacement element.

4. Method according to claim 1, in which, in the event that the rotor turns and effects compression, the commutation time intervals in asynchronous commutation are increased compared to the commutation time intervals without compression so that a substantial portion of compressed gas leaks past the displacement element.

5. Method according to claim 1, in which the compressor is an axial piston compressor and the rotor is turned by asynchronous commutation first from its rest position to an intermediate position corresponding approximately to bottom dead-centre and only then is turned to the starting position.

6. Method according to claim 5, in which to reach the intermediate position between two commutation times, the current through the stator is switched off.

7. Method according to claim 1, in which the compressor is a single-cylinder rotation-type compressor and the rotor is turned by asynchronous commutation first from its rest position to an intermediate position, where a slider of the compressor protrudes into the cylinder and together with a displacement element divides the cylinder into approximately two equal halves, and only then is turned to the starting position.

8. Method according to claim 7, in which to reach the intermediate position between two commutation times, the current through the stator is switched off.

9. Motor/compressor combination, for hermetically-encapsulated small refrigerating machines, comprising a brushless motor which has a stator having at least two windings and a rotor having permanent magnet poles, and a control arrangement having means for applying current to the windings in successive patterns and, for starting, means for effecting asynchronous and then synchronous commutation of those current-application patterns, the compressor having a periodically operating displacement element such that output from the compressor is intermittent and the means for effecting being formed such that current-application patterns succeed one another in asynchronous commutation in such a manner that the rotor is turned from a rest position to a starting position that facilitates start-up so that the motor can then be started from that starting position.

10. Motor/compressor combination according to claim 9, in which, in the case that on turning the rotor a relatively high compression is encountered, the control arrangement includes means for rendering the current-application patterns effective over a longer period of time than when lesser compression is encountered.

11. Motor/compressor combination according to claim 9, in which the motor has four poles and the stator has three windings in star connection and the control arrangement has means to produce six current-application patterns in each of which one winding has current applied and the other two windings have one half of that current applied and, in asynchronous commutation, render those current-application patterns effective in a predetermined sequence.

12. Motor/compressor combination according to claim 11, in which, the predetermined sequence includes a first current-application pattern which drives the rotor to one of at least two dead-centre positions, a second current-application pattern which displaces the rotor from one of the dead-centre positions, and a switching off of the current in which the rotor moves under the influence of the compressed gas into the vicinity of a bottom dead-centre position.

13. Motor/compressor combination according to claim 12, in which the predetermined sequence also includes a third current-application pattern, which drives the rotor exactly into the bottom dead-centre position.

14. Motor/compressor combination according to claim 11, in which, in the predetermined sequence, current-application patterns succeed one another that correspond to rotor positions that are each displaced by 30° with respect to one another, and the rotor is turned from an intermediate position corresponding approximately to bottom dead-centre to the starting position corresponding to top dead-centre.

15. Motor/compressor combination according to claim 14, in which the effective duration of preceding current-application patterns is shorter than the effective duration of subsequent current-application patterns.

* * * * *